US012660960B2

(12) United States Patent (10) Patent No.: US 12,660,960 B2
Reifert et al. (45) Date of Patent: Jun. 23, 2026

(54) COOKING APPLIANCE, STRAINING DEVICE AND USE

(71) Applicant: Miele & Cie. KG, Guetersloh (DE)

(72) Inventors: Micha Reifert, Buende (DE); Ralf Ellersiek, Buende (DE)

(73) Assignee: Miele & Cie. KG, Guetersloh (DE)

( * ) Notice: Subject to any disclaimer, the term of this patent is extended or adjusted under 35 U.S.C. 154(b) by 877 days.

(21) Appl. No.: 18/059,447

(22) Filed: Nov. 29, 2022

(65) Prior Publication Data

US 2023/0165402 A1 Jun. 1, 2023

(30) Foreign Application Priority Data

Dec. 1, 2021 (DE) .......................... 102021131661.8

(51) Int. Cl.
*A47J 36/16* (2006.01)

(52) U.S. Cl.
CPC ..................................... *A47J 36/16* (2013.01)

(58) Field of Classification Search
CPC ............. F24D 2200/20; F24D 17/0005; F24D 19/1051; F24D 17/0073; F24D 17/001; F24D 17/0078; F24D 17/02; F24D 17/0052; F24D 2200/12; F24D 17/00; F24D 2200/14; F24D 2200/08; F24D 17/0089; F24D 17/0057; F24D 15/00; F24D 12/02; F24D 17/0026; F24D 2220/08; F24D 2220/042; F24D 3/10; F24D 19/10; F24D 17/0031; F24D 2200/04; F24D 2200/11; F24D 2200/22; F24D 2220/044; F24D 17/0094; F24D 3/18; F24D 3/08; F24D 2200/123; F24D 3/14; F24D 2220/0207; F24D 17/0036; F24D 19/088; F24D 19/1054; F24D 2200/16; F24D 11/0214; F24D 15/02; F24D 2240/26; F24D 18/00; F24D 19/0092; F24D 19/1063; F24D 11/025; F24D 11/02; F24D 2220/0257; F24D 2220/06; F24D 2220/10; F24D 2220/209; F24D 11/003; F24D 11/0221; F24D 19/1006; F24D 2240/00; F24D 11/005; F24D 15/04; F24D 19/0095; F24D 19/1039; F24D 2103/13; F24D 2200/32;
(Continued)

(56) References Cited

U.S. PATENT DOCUMENTS

| | | | |
|---|---|---|---|
| 3,080,155 A | 3/1963 | Glitsch et al. | |
| 3,333,836 A | 8/1967 | Bahout | |
| 10,822,785 B1 * | 11/2020 | Berry ................... | E03F 5/0404 |

FOREIGN PATENT DOCUMENTS

| | | |
|---|---|---|
| DE | 102019109152 A1 | 10/2020 |
| EP | 3715723 A1 | 9/2020 |

OTHER PUBLICATIONS

Lin, CN 110973991 A (Year: 2020).*
Wu, CN 208864101 U (Year: 2019).*

* cited by examiner

*Primary Examiner* — Vy T Nguyen

(74) *Attorney, Agent, or Firm* — Leydig, Voit & Mayer, Ltd.

(57) ABSTRACT

A straining device for a cooking appliance includes: at least one straining body having at least two passages for draining liquid. At least one passage provided as a hole. At least one passage is provided as an embossment. In an embodiment, the at least one straining body includes a plurality of embossments along a circumference of the at least one straining body.

14 Claims, 2 Drawing Sheets

(58) Field of Classification Search
CPC ........... F24D 2220/0271; F24D 10/003; F24D 13/00; F24D 17/0015; F24D 19/00; F24D 19/1069; F24D 19/1072; F24D 19/1096; F24D 2101/40; F24D 5/02; F24D 11/004; F24D 11/007; F24D 13/02; F24D 13/04; F24D 17/0047; F24D 19/1066; F24D 2200/18; F24D 2220/0228; F24D 5/12; F24D 10/00; F24D 13/024; F24D 17/0068; F24D 17/0084; F24D 19/1057; F24D 2101/30; F24D 2103/17; F24D 2200/31; F24D 2220/02; F24D 17/0021; F24D 19/0002; F24D 19/083; F24D 19/106; F24D 19/1081; F24D 2220/046; F24D 2220/048; F24D 3/005; F24D 3/082; E03C 1/0408; E03C 1/22; E03C 2001/005; E03C 1/00; E03C 1/12; E03C 1/264; E03C 1/29; E03C 1/122; E03C 1/04; E03C 1/20; E03C 1/01; E03C 1/044; E03C 1/06; E03C 1/02; E03C 1/055; E03C 1/28; E03C 1/26; E03C 1/046; E03C 1/0404; E03C 1/1222; E03C 1/284; E03C 2201/40; E03C 1/1227; E03C 1/232; E03C 1/0409; E03C 1/021; E03C 1/298; E03C 2201/30; E03C 1/023; E03C 1/057; E03C 1/23; E03C 1/025; E03C 1/14; E03C 1/262; E03C 1/24; E03C 1/041; E03C 1/042; E03C 1/2306; E03C 1/30; E03C 1/302; E03C 1/05; E03C 1/308; E03C 2001/0418; E03C 1/126; E03C 2001/026; E03C 1/066; E03C 1/2302; E03C 2001/0415; E03C 2201/80; E03C 1/08; E03C 1/306; E03C 1/084; E03C 1/0412; E03C 1/102; E03C 1/108; E03C 1/10; E03C 1/0405; E03C 1/244; E03C 1/182; E03C 1/292; E03C 1/18; E03C 1/242; E03C 1/282; E03C 2001/1206; E03C 1/104; E03C 1/281; E03C 1/2304; E03C 1/266; E03C 1/0403; E03C 1/288; E03C 1/294; E03C 2001/2311; E03C 2001/2317; E03C 1/086; E03C 1/2665; E03C 2201/90; E03C 1/1225; E03C 1/304; E03C 1/106; E03C 1/16; E03C 1/052; E03C 2201/00; E03C 1/048; E03C 2201/70; E03C 2001/0414; E03C 1/0401; E03C 1/0465; E03C 2201/50; E03C 1/328; E03C 2001/0417; E03C 1/32; E03C 2001/028; E03C 2001/1213; E03C 2201/60; E03C 2001/2413; E03C 1/324; E03C 2001/2315; E03C 1/186; E03C 1/295; E03C 2001/2406; E03C 1/0402; E03C 1/063; E03C 2001/082; E03C 2001/2313; E03C 1/326; E03C 1/184; E03C 1/296; E03C 1/0411; E03C 1/322; E03C 2001/0416; A47K 3/40; A47K 3/28; A47K 3/281; A47K 3/405; A47K 4/00; A47K 3/282; A47K 3/001; A47K 3/36; A47K 3/38; A47K 3/008; A47K 3/284; A47K 3/022; A47K 3/325; A47K 3/286; A47K 3/32; A47K 3/02; A47K 3/283; A47K 1/14; A47K 3/1605; A47K 3/34; A47K 3/16; A47K 3/20; A47K 2003/305; A47K 3/17; A47K 10/48; A47K 3/006; A47K 3/00; A47K 3/06; A47K 3/288; A47K 3/122; A47K 3/002; A47K 7/04; A47K 3/003; A47K 3/125; A47K 1/04; A47K 2201/02; A47K 1/02; A47K 17/022; A47K 3/024; A47K 5/02; A47K 3/04; A47K 7/026; A47K 2201/00; A47K 3/007; A47K 3/362; A47K 2003/307; A47K 17/00; A47K 3/127; A47K 7/08; A47K 13/305; A47K 7/046; A47K 5/12; A47K 5/1217; A47K 3/285; A47K 7/02; A47K 2010/3226; A47K 2010/3668; A47K 3/302; A47K 1/12; A47K 3/12; A47K 7/03; A47K 2003/367; A47K 3/004; A47K 3/162; A47K 3/26; A47K 3/03; A47K 3/062; A47K 3/10; A47K 5/18; A47K 11/02; A47K 11/04; A47K 13/10; A47K 1/08; A47K 5/00; A47K 3/07; A47K 5/04; A47K 10/10; A47K 3/064; A47K 3/14; A47K 3/1615; A47K 5/03; A47K 11/12; A47K 17/026; A47K 2201/025; A47K 3/034; A47K 1/00; A47K 1/09; A47K 11/10; A47K 2003/365; A47K 7/024; A47K 10/38; A47K 17/024; A47K 3/08; A47K 10/22; A47K 13/24; A47K 17/028; A47K 3/287; A47K 10/04; A47K 13/00; A47K 17/02; A47K 7/00; A47K 3/164; A47K 5/1211; A47K 10/06; A47K 13/14; A47K 5/05; A47K 10/00; A47K 11/00; A47K 3/161; A47K 5/1201; A47K 1/05; A47K 10/424; A47K 13/12; A47K 2010/428; A47K 10/34; A47K 11/105; A47K 3/18; A47K 5/1202; A47K 5/1205; A47K 7/06; A47K 11/026; A47K 13/30; A47K 5/08; A47K 7/043; A47K 10/02; A47K 10/16; A47K 11/06; A47K 13/005; A47K 13/04; A47K 13/105; A47K 2005/1218; A47K 2010/3266; A47K 2210/00; A47K 3/005; A47K 3/074; A47K 5/122; A47K 7/022
USPC ....... 219/126, 369, 377.1, 401, 682; 99/348, 99/410, 422, 446, 325, 352, 353, 413, 99/415, 416, 417, 425, 450, 482, 510; 366/146, 147; 426/509, 510
See application file for complete search history.

COOKING APPLIANCE, STRAINING DEVICE AND USE

CROSS-REFERENCE TO PRIOR APPLICATION

Priority is claimed to German Patent Application No. DE 10 2021 131 661.8, filed on Dec. 1, 2021, the entire disclosure of which is hereby incorporated by reference herein.

FIELD

The present invention relates to a straining device for a cooking appliance comprising at least one straining body with at least two passages for draining liquid, wherein at least one passage is designed as a hole. Furthermore, the present invention relates to a use of such a straining device in a cooking appliance and a cooking appliance, in particular a steam cooking appliance, comprising at least one cooking chamber with at least one opening for filling the cooking chamber and at least one door for closing the opening of the cooking chamber. In this case, the cooking chamber is delimited at least by a bottom wall and is heatable by means of at least one steam source, wherein the bottom wall has at least one liquid discharge opening by means of which at least one liquid can be discharged from the cooking chamber into a liquid discharge device.

BACKGROUND

In the prior art, a large number of straining devices have become known which in particular separate and retain solids from a liquid-solid mixture. These known straining devices operate in a substantially reliable manner.

Straining devices are also installed in cooking appliances or used therein. Such straining devices for cooking appliances often have to satisfy special requirements. A straining device for a cooking appliance therefore typically does not have to separate only solids from a liquid-solid mixture, but preferably also has to provide a visually pleasing design, remove liquids in a particularly fast and reliable way, and be easy to clean.

For example, steam cooking appliances in which steam or water vapor, in particular for food preparation, is introduced into a cooking chamber by means of a steam source, or cooking appliances with steam function, typically have a straining device in order in particular to conduct a liquid, such as for example water, produced during condensation of the steam, out of the cooking chamber, and at the same time to retain solids, such as food residues, deposits and/or particles in the cooking chamber.

SUMMARY

In an embodiment, the present invention provides a straining device for a cooking appliance, comprising: at least one straining body having at least two passages configured to drain liquid, wherein at least one passage comprises a hole, and wherein at least one passage comprises an embossment.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
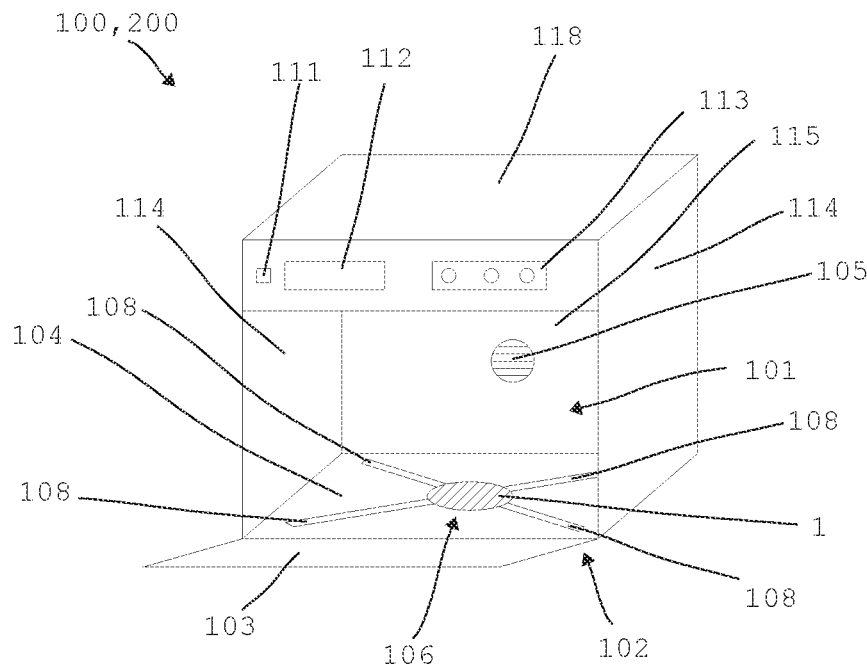
FIG. 1 a purely schematic illustration of an exemplary embodiment of a cooking appliance according to the invention with a straining device according to the invention in a perspective view.

In an embodiment, the present invention provides a straining device for a cooking appliance which advantageously develops the prior art and in particular enables a rapid and reliable draining of liquid.

The straining device for a cooking appliance according to the invention comprises at least one straining body with at least two passages for draining liquid, wherein at least one passage is provided as a hole. At least one passage is provided by at least one embossment.

In advantageous developments, the straining body has more than two passages, wherein in particular a plurality of passages are formed as a hole.

In this case, a hole is in particular a embossment, an opening, a borehole, a cutout and/or the like.

Preferably, at least one passage is suitable and designed to substantially separate and retain the solids from a solid-liquid mixture.

In advantageous developments, all passages are suitable and designed to substantially separate and retain the solids from a solid-liquid mixture.

In this case, separation is also understood to mean, in particular, straining and/or filtering.

Solids are understood to mean, in particular, solid particles, food, food residues, food leftovers, soiling deposits, in particular solid deposits detached in a film-like manner and/or other particles.

Preferably, the straining body is formed from sheet metal, plastic and/or a similarly suitable material.

Preferably, the straining device, in particular the at least one hole and/or the at least one embossment, separates solid particles with dimensions greater than 7 mm, preferably greater than 5 mm, preferably greater than 3 mm, particularly preferably greater than 1 mm, very particularly preferably greater than 0.5 mm or even smaller from the solid-liquid mixture, and retains them.

In advantageous developments, the at least one embossment has a width of 3 mm to 5 mm, in particular of 5 mm to 7.5 mm, preferably of 7.5 mm to 10 mm, particularly preferably of 10 mm to 15 mm, and very particularly preferably of 15 mm to 20 mm or even more.

In preferred developments, the at least one embossment has a height of 1 mm to 2 mm, in particular of 2 mm to 3 mm, preferably of 3 mm to 4 mm, particularly preferably of 4 mm, 5 mm or even more.

In this case, a cross-section of the embossment is in particular a surface which is provided by the product of the width and the height of the embossment.

Preferably, the at least two passages are suitable and designed to drain liquid through the straining device, in particular from a region above the upper side of the straining body to a region below the underside of the straining body.

The straining device according to the invention offers many advantages. A significant advantage is that at least one passage is provided by at least one embossment.

Because at least one passage is provided by at least one embossment, solids from a solid-liquid mixture can be separated and retained particularly reliably. For example, solid particles, food residues and/or detached deposits of a wide variety of forms and sizes are separable from a solid-liquid mixture and can be retained by a straining device in which at least one passage is configured as an embossment.

Furthermore, a passage formed as an embossment in combination with a section, in particular a section of a bottom wall, can form and/or provide a channel which enables a particularly reliable and rapid discharge of liquid, in particular from a cooking chamber of a cooking appliance.

In particular, a passage configured as a embossment also allows reliable and rapid draining of liquid if a larger amount of solids and/or larger solid deposits, in particular larger flat or film-like solid deposits, is separated by the straining device from a solid-liquid mixture and retained by the straining device. This is because a passage formed as a embossment clogs less quickly or reduces the probability of clogging the straining device.

A passage provided by embossment can also be produced in a particularly simple and cost-effective manner and provides a straining device with a design that is visually pleasing and appears valuable.

The straining body preferably comprises a plurality of embossments along its circumference, each of which provides at least one passage.

Preferably, the straining device comprises a plurality of, in particular 2 to 4, preferably 4 to 6, particularly preferably 6 to 8 or even more embossments, which in particular each provide at least one passage along its circumference.

In advantageous developments, the at least one embossment and in particular all embossments are arranged on the outer edge of the straining body.

In useful developments, the at least one embossment is designed like a hood and/or step. In particular, the at least one embossment projects outward or out of the upper side of the straining body.

Preferably a deformation of the embossment is aligned in the direction of the upper side of the body.

The upper side of the body in particular faces the solid-liquid mixture, and the underside of the body faces a drained liquid.

In particular, solids are retained by the straining device and/or the straining body on the upper side of the straining body.

Preferably, a plurality of embossments are arranged symmetrically in the straining body.

Preferably, the straining body is substantially circular.

In this case, substantially circular is to be understood in particular as circular, oval and/or the like.

In useful developments, the at least one embossment is oriented radially.

In preferred developments, the straining body has, at least sectionally, a convex upper side.

Preferably, the straining body has an outwardly domed upper side at least sectionally.

In useful developments, solids are retained by the straining device and/or the straining body on the upper side of the straining body.

In advantageous embodiments, the straining body is designed to be convex and/or domed.

In a preferred development, the straining device comprises at least one locking device by means of which at least the straining body can be locked in a cooking appliance at least on a section of the cooking appliance when in an installed state.

Lockable means in particular that it is reversibly mountable, fastenable, receivable, and/or the like.

Preferably, the straining body can be locked by means of the locking device when in an installed state in a cooking appliance in a section of the liquid discharge device and/or the liquid discharge opening of the cooking appliance.

Preferably, the locking device locks and/or holds the straining device on at least one section of the cooking appliance, so that the straining device does not unintentionally detach from the cooking appliance, for example due to shocks, vibrations and/or flow pressure of a liquid, which partially flows through and/or around the straining device, and/or a solid-liquid mixture, and/or the straining device does not slip out of its predetermined position.

In advantageous developments, the locking device is suitable and designed to releasably orient the straining device on at least one section of the cooking appliance, in particular over or above a liquid discharge device of the cooking appliance.

The locking device is preferably accommodated on the straining body. In advantageous developments, the locking device is provided, for example, by a U-shaped body, an over-dimensioned clamp or the like.

In particular with a provided and/or advantageous locking of the straining device at at least one section of the cooking appliance by means of the locking device, this is haptically and/or acoustically perceivable for a user.

Preferably, the straining device, in particular the locking device, is designed such that the straining device can only be received in at least one section of a cooking appliance in such a way that the upper side of the straining body faces the cooking chamber.

In preferred developments, the straining device comprises at least one orientation device which enables positioning of the straining body installed in a cooking appliance in at least one predetermined orientation on at least one section of the cooking appliance.

Preferably, the orientation device is provided at least sectionally by the locking device.

In advantageous developments, the orientation device enables the straining device to be locked exclusively in at least one, preferably in several predetermined orientations.

In useful developments, the number of predetermined orientations is equal to the number of embossments, in particular equal to the number of embossments which provide a passage.

In this case, a predetermined orientation is in particular a predetermined rotation of the straining device and/or the straining body about a normal through the center of the surface of the straining body.

The cooking appliance according to the invention is in particular designed as a steam cooking appliance and comprises at least one cooking chamber with at least one opening for filling the cooking chamber, and at least one door for closing the opening of the cooking chamber, wherein the cooking chamber is delimited at least by a bottom wall and can be heated by means of at least one steam source. The bottom wall has at least one liquid discharge opening, by means of which at least one liquid can be discharged from the cooking chamber into a liquid discharge device. At least one straining device, as described above, is arranged at least sectionally above the liquid discharge opening.

Preferably, the cooking appliance or in particular the steam cooking appliance is provided by a steam cooker or a cooking appliance with steam function.

In useful developments, the cooking appliance comprises at least one control device, and/or at least one display device, and/or at least one operating device.

In advantageous developments, the cooking chamber is delimited by a housing device which, in addition to the bottom wall, comprises in particular two side walls, a back wall and a top wall.

The cooking chamber is preferably heatable by means of at least one steam source. In particular, the steam source makes it possible for steam or water vapor to be fed into the cooking chamber so that food can be cooked and, in particular, evaporated in the cooking chamber. In particular, by condensing water vapor sectionally of the cooking chamber with a low temperature and/or by introducing water, a liquid and/or a solid-liquid mixture is preferably formed in the cooking chamber, which is preferably drained from the cooking chamber and has to be substantially freed from solids in particular for reuse or disposal of the liquid.

The liquid discharge device preferably provides at least one discharge by means of which at least one liquid can be drained. In this case, the liquid discharge device is preferably surrounded at least sectionally by the cooking appliance. Depending on the task and configuration, however, the liquid discharge device can also be provided by an external device and/or connection.

In useful developments, the straining device is removable and preferably can be removed from the cooking appliance, in particular for cleaning.

The cooking appliance according to the invention offers many advantages. One significant advantage is that at least one straining device, as described above, is arranged at least sectionally above the liquid discharge opening.

Because the cooking appliance comprises at least one straining device as described above and which is arranged at least sectionally above the liquid discharge opening, solids from a solid-liquid mixture can be separated particularly reliably and retained in the cooking chamber. For example, solid particles, food residues and/or detached deposits which typically occur in the cooking chamber of a cooking appliance, in particular of a steam cooking appliance, can be separated from a solid-liquid mixture and retained in the cooking chamber.

This makes it possible for a liquid that is drained through the liquid discharge opening to be reused after further processing or even directly to produce steam by means of the steam source. This allows the operation of the cooking appliance to be particularly energy and/or resources-saving.

This can also substantially prevent the liquid discharge opening and/or the liquid discharge device from clogging, and/or, after a short operating time of the cooking appliance, solid deposits from depositing or forming in the liquid discharge opening and/or in the liquid discharge device, which are typically removable only by an often complex and complicated or user-unfriendly cleaning of the respective components.

Furthermore, solids can easily be removed from the cooking chamber, and the cooking chamber can be cleaned in a user-friendly manner.

Another significant advantage of the cooking appliance is that the straining device, as previously described, can form and/or provide a channel in combination with a section of the bottom wall, which allows a particularly reliable and rapid discharge of liquid, in particular from a cooking chamber of a cooking appliance.

Given the correct operation of the cooking appliance, this can therefore substantially prevent a larger amount of the solid-liquid mixture and/or a liquid from accumulating on the bottom wall, and thereby disturbing or even completely preventing the preparation of foods in the cooking appliance. This also makes it possible to substantially prevent a solid-liquid mixture and/or a liquid from accumulating on the bottom wall and then exiting the opening of the cooking chamber.

Preferably, the at least one bottom wall comprises at least one guide device by means of which at least one liquid and/or a solid-liquid mixture can be guided in the direction of the liquid discharge opening. As a result, a liquid and/or a solid-liquid mixture can be guided in the direction of the liquid discharge opening particularly reliably and quickly.

In useful developments, the at least one bottom wall provides the at least one guide device at least sectionally. Preferably, the at least one guide device is provided by a depression and or bead of the bottom wall.

In advantageous developments, the at least one guide device has a width of 3 mm to 5 mm, in particular of 5 mm to 7.5 mm, preferably of 7.5 mm 10 mm, particularly preferably of 10 mm, 15 mm, and very particularly preferably 15 mm to 20 mm or even more. Preferably, the width of at least one guide device substantially corresponds to the width of the at least one embossment of the straining device.

Preferably, the width of at least one guide device substantially corresponds to at least one width of the at least one embossment of the straining device.

In advantageous developments, the at least one guide device has a constant width. Depending on the task and embodiment, however, the width of the at least one guide device can also vary in particular over a longitudinal extension of the guide device. In particular, the width of the at least one guide device decreases and/or increases in the direction of the liquid discharge opening.

The at least one guide device preferably has a depth of 0.5 mm or 1 mm to 2 mm, in particular of 2 mm to 3 mm, preferably of 3 mm to 4 mm, and particularly preferably of 4 mm to 5 mm or even more. Preferably, the depth of at least one guide device substantially corresponds to the height of the at least one embossment of the straining device.

Preferably, the at least one guide device has a constant depth. Depending on the task and embodiment, the depth of the at least one guide device can also vary. In particular, the depth of the at least one guide device decreases and/or increases in the direction of the liquid discharge opening.

A cross-section of the at least one guide device is in particular a surface which is the product of the width and the depth of the guide device.

In particular, with a straining device positioned in the cooking appliance according to use, the at least one embossment of the straining device is aligned with the guide device in such a way that the at least one guide device and the at least one embossment form at least one common channel for draining liquid, and/or the embossment is arranged in an end section of the guide device in order to allow liquid to be drained into the liquid discharge opening.

In advantageous developments, the at least one guide device is oriented in a sloping manner at least sectionally towards the liquid discharge opening.

In particular, the at least one guide device has, at least sectionally, a slope to the liquid discharge opening within the range of 1° or 2° to 5°, preferably in the range of 5° to 7°, preferably in the range of 7° to 10° or even more.

Preferably, the at least one bottom wall is oriented downward at least sectionally towards the liquid discharge opening and/or towards the at least one guide device.

In particular, the at least one bottom wall has, at least sectionally, a slope to the liquid discharge opening and/or the guide device within the range from 2° to 5°, preferably within the range from 5° to 7°, preferably within the range from 7° to 10° or even more.

Preferably, the at least one bottom wall comprises several, in particular eight guide devices.

The bottom wall preferably comprises two, or three, or four, or five, or six, or seven, or eight, or even more guide devices.

In useful developments, the straining device can be locked to the liquid discharge device by means of the locking device.

Preferably, the straining device can be locked by means of the locking device in a transitional section such as for example a weld seam, in one section, between the bottom wall and the liquid discharge device.

Preferably, the straining device can be locked to the liquid discharge opening by means of the locking device.

The cooking appliance and in particular the bottom wall and/or the liquid discharge device preferably comprise at least one positioning device which enables reproducible positioning of the straining device in and/or above the liquid discharge opening.

In particular, the positioning device enables a flush and/or form-fitting positioning of the straining device in at least one section of the bottom wall, in particular in and/or on the liquid discharge opening.

Preferably, the positioning device allows or supports positioning of the straining device in the at least one predetermined orientation, in particular by interaction with the orientation device.

Preferably, the straining device can be locked over the liquid discharge opening exclusively in the at least one predetermined orientation by means of the locking device.

In this case, the at least one predetermined orientation is in particular a predetermined rotation of the straining device, and/or of the straining body about a normal through the center of the surface of the straining body, and/or about a normal of the bottom wall.

In advantageous developments, at least the cross-section of the at least one embossment of the straining device and the cross-section of the at least one guide device are arranged substantially congruently to each other in the at least one predetermined orientation, so that at least one liquid can be guided and/or is guided out of the cooking chamber via the at least one guide device and through the at least one embossment to the liquid discharge.

In particular, at least one liquid can be optimally guided to the liquid discharge opening in the at least one predetermined orientation.

Preferably, in the at least one predetermined orientation, the width of the at least one embossment and the width of the at least one guide device are arranged substantially congruently with one another, so that at least one liquid can be guided out of the cooking chamber via the at least one guide device and through the at least one embossment to the liquid discharge opening.

According to the invention, a straining device as previously described is used in a cooking appliance.

The use according to the invention of a straining device, as was described above, provides the straining device with the above-described advantages of the straining device.

FIG. 1 shows purely schematically an exemplary embodiment of a cooking appliance 100 according to the invention with a straining device 1 according to the invention in a perspective view.

The cooking appliance 100, which is designed here as a steam cooking appliance 200, comprises here a cooking chamber 101 with an opening 102 for filling the cooking chamber 101, and at least one door 103 for closing the opening 102 of the cooking chamber 101. Furthermore, in the exemplary embodiment shown here, the cooking appliance 100 comprises a control device 111 for controlling the cooking appliance 100, a display device 112 for displaying functions and the operating setting of the cooking appliance 100, and an operating device 113 for operating the cooking appliance 100.

The cooking chamber 101 is delimited here by a bottom wall 104, two side walls 114, a back wall 115 and a top wall, not shown in greater detail.

The cooking chamber 101 of the cooking appliance 100 can be heated in this case by means of a steam source 105. Thus, for example, during the operation of the cooking appliance 100 water vapor can be guided into the cooking chamber 101, which vapor condenses partially on the bottom wall 104, the side walls 114, the back wall 115 and the top wall. As a result, a liquid and/or a solid-liquid mixture can form in the cooking chamber.

The bottom wall 104 here has a liquid discharge opening 106, by means of which a liquid from the cooking chamber 101 can be discharged into a liquid discharge device 107. The liquid discharge opening 106 is round and is arranged here in a central section of the bottom wall 104. Depending on the task and embodiment, it is also possible for the liquid discharge opening 106 to be arranged in another section, e.g., in an outer section of the bottom wall 104.

In the exemplary embodiment shown here, the bottom wall 104 is designed to slope in the direction of the liquid discharge opening 106. The liquid discharge opening 106 is therefore arranged here at the lowest point of the bottom wall 104 so that a solid-liquid mixture and/or a liquid can flow in the direction of the liquid outflow opening. Here, the bottom wall 104 has a slope relative to the liquid discharge opening 106 of approximately 5°. However, the inclination can also be larger or smaller depending on the design.

In the exemplary embodiment shown here, the bottom wall 104 comprises four guide devices 108, by means of which a liquid and/or a liquid-solid mixture can be guided in the direction of the liquid discharge opening 106. Here, the four guide devices 108 are each provided by a deformation in the form of a depression in the bottom wall 104.

Each of the four guide devices 108 is designed here to slope in the direction of the liquid discharge opening 106. Here, the slope of each of the four guide devices 108 to the liquid discharge opening 106 is approximately 5°.

In the exemplary embodiment shown here, a straining device 1 according to the invention is arranged above the liquid discharge opening 106. The straining device 1 here can separate solids, such as food residues and deposits, from a solid-liquid mixture and retain it in the cooking chamber 101. The straining device 1 here therefore substantially prevents solids from passing through the liquid discharge opening 106 into the liquid discharge device 107. At the same time, in the exemplary embodiment shown here, the straining device 1 enables a rapid discharge of liquid from the cooking chamber 101 through the liquid discharge opening 106 into the liquid discharge device 107. This enables a particularly advantageous operation of the cooking appliance 100 designed here as a steam cooking device 200.

Figure 2:
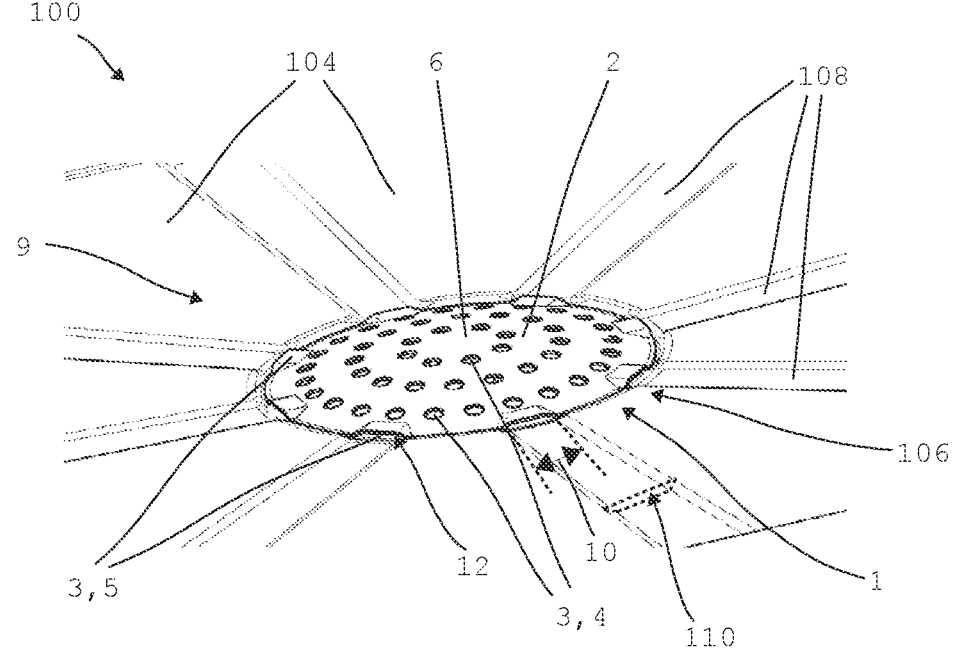
FIG. 2 a purely schematic illustration of an exemplary embodiment of a straining device according to the invention for a cooking appliance in an installed state in a cooking appliance in a perspective view.

FIG. 2 shows purely schematically an exemplary embodiment of a straining device 1 according to the invention for a cooking appliance 100 in an installed state in a cooking appliance 100 in a perspective view.

As in FIG. 1, the cooking appliance 100 here comprises a cooking chamber 101 with a bottom wall 104. In the exemplary embodiment shown here, the bottom wall 104 comprises a liquid discharge opening 106 through which a liquid can be drained here from the cooking chamber 101 into a liquid discharge device 107.

The bottom wall 104 is also designed to slope in the direction of the liquid discharge opening 106 and has eight guide devices 108.

The bottom wall 104 and the guide devices 108 arranged here in a star shape around the liquid discharge opening 106 are designed to slope in the direction of the liquid discharge opening 106. Thus, the eight guide devices 106 are aligned radially with respect to the liquid discharge opening 106 and allow a liquid and/or a liquid-solid mixture to be discharged in the direction of the liquid discharge opening 106 arranged here at the lowest point of the bottom wall 104. A solid-liquid mixture and/or a liquid can therefore flow in the direction of the liquid outflow opening.

Here, the eight guide devices 108 are each provided by a depression in the bottom wall 104. Here, the slope of each of the four guide devices 108 to the liquid discharge opening 106 is approximately 5°.

In the exemplary embodiment shown here, each of the guide devices 108 in a section near the liquid discharge opening 106 has a width 116 of 10 mm and a depth 117 of 2 mm. Depending on the task and embodiment, each of the guide devices 108 can also have a different width 116 and/or depth 117. The width 117 and/or depth 117 can also vary over the longitudinal extension of a guide device 108.

As in FIG. 1, a straining device 1 is arranged here above the liquid discharge opening 106. Here, the straining device 1 is arranged substantially with a positive fit with respect to the bottom wall 104 above the liquid discharge opening 106.

The straining device 1 here comprises a substantially circular straining body 2 with an upper side 6, which is here embodied in a convex manner and which here faces the cooking chamber 101. Depending on the task and embodiment, the straining body 2 can also be domed, so that the upper side 6 bulges into the cooking chamber 101.

The straining body 1 here has a plurality of passages 3 for draining liquid. Here, a plurality of passages 3 are designed as holes 4 in an inner section of the straining body 2. Along the circumference of the straining body 1, the straining device 1 here has eight passages 3, which are each designed as an embossment 5.

The eight embossments 5 are designed in a step-like or cowl-shaped manner and aligned radially along the circumference of the straining body 2.

In the exemplary embodiment shown here, each of the embossments 5 has a width 10 of approximately 10 mm and a height 11 of approximately 2 mm. Depending on the task and embodiment, each of the embossments 5 can also have a different width 10 and/or height 11.

In the exemplary embodiment shown here, each passage 3, that is to say each hole 4 and each embossment 5, makes it possible to discharge liquid from the cooking chamber 101 through the straining device to the liquid discharge opening 106. Solids such as food residues and deposits, with dimensions greater than or equal to the dimensions of the holes and embossments, cannot pass through the passages 3 and are therefore separated from a solid-liquid mixture by the straining device 1 and retained in the cooking chamber 101. The straining device 1 here therefore substantially prevents solids from passing through the liquid discharge opening 106 into the liquid discharge device 107.

In the installed state of the straining device 1 shown here in the cooking appliance 100, the straining device 1 is oriented such that the cross-section 12 of each of the eight embossments 5 and the cross-section 110 of each of the eight guide devices 108 are arranged in a substantially congruent manner with respect to one another.

Thus, the straining device 1 here is rotated about a normal through the center point of the straining body 2 in such a way that, in such a predetermined orientation 9, each of the embossments 5 together with a respective one of the guide devices 108 form a common continuous channel, through which a liquid can be guided particularly well and quickly out of the cooking chamber 101 through the liquid discharge opening 106.

Thus, the straining device 1 allows solids to be separated from a solid-liquid mixture and retained in the cooking chamber 101, while liquid can also be fed from the cooking chamber 101 to the liquid discharge opening 106.

Figure 3:
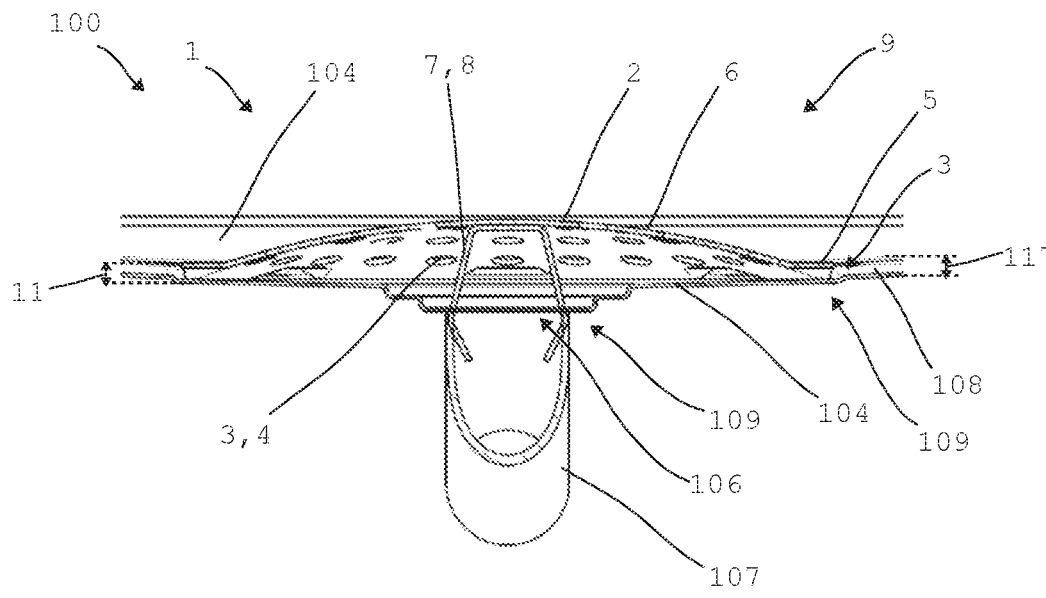
FIG. 3 a purely schematic illustration of another exemplary embodiment of a straining device according to the invention for a cooking appliance in an installed state in a cooking appliance in a sectional view from the side.

FIG. 3 shows purely schematically a further exemplary embodiment of a straining device 1 according to the invention for a cooking appliance 100 in an installed state in a cooking appliance 100 in a sectional view from the side.

The cooking appliance 100 here comprises a cooking chamber 101 having a bottom wall 104. Here, the bottom wall 104 has a liquid discharge opening 106 through which a liquid can be discharged here from the cooking chamber 101 into a liquid discharge device 107. Furthermore, the bottom wall 104 here has a plurality of guide devices 108 sloping towards the liquid discharge opening 106.

In the exemplary embodiment shown here, the straining device 1 is arranged substantially with a positive fit with the bottom wall 104 above the liquid discharge opening 106.

Here, a positioning device 109, which is provided here by a depression of the bottom wall 104 around the liquid discharge opening 106 with substantially the same lateral dimensions as that of the straining device 1, enables reproducible and advantageous positioning of the straining device 1 above the liquid discharge opening 106.

As in FIG. 2, the straining device 1 here has a substantially circular, cambered straining body 2 with a top side 6 bulging into the cooking chamber and with several passages 3 for draining liquid. Here, a plurality of passages 3 are formed by holes 4 in the inner section of the straining body 2 and a plurality of passages 3 are formed by an embossment 5 along the circumference of the straining body 2. Thus, the straining device 1 here makes it possible to separate and retain solids from a solid-liquid mixture.

The straining device 1 here has a locking device 7, by means of which the straining device 1 is locked in the vicinity of the liquid discharge opening 106 on a section of the liquid discharge device 107, so that the straining device 1 cannot slip out of the predetermined position and the predetermined orientation 9. The locking device is designed here as a U-shaped clamp which, when the straining device 1 is correctly locked, causes a perceptible noise heard by a user.

In the exemplary embodiment shown here, the locking device 7 provides an orientation device 8, so that the straining device 1 can be locked here by means of the locking device 7 exclusively in a predetermined orientation 9 above the liquid discharge opening.

In the one possible predetermined orientation 9 shown here, the embossments 5 are oriented such that In each case one of the embossments 5 together with a respective one of the guide devices 108 form a common continuous channel through which a liquid can be guided particularly well and quickly out of the cooking chamber 101 through the liquid discharge opening 106.

Figure 4:
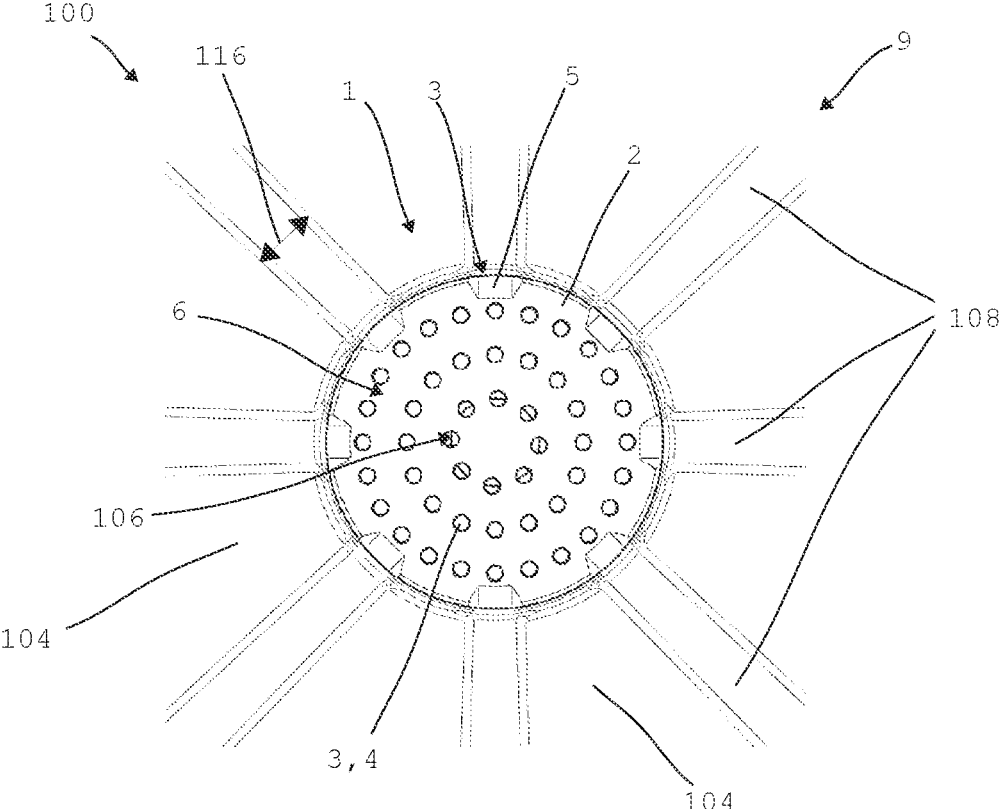
FIG. 4 a purely schematic illustration of another exemplary embodiment of a straining device according to the invention for a cooking appliance in an installed state in a cooking appliance in a view from above.

FIG. 4 schematically shows a view from above of another exemplary embodiment of a straining device 1 according to the invention for a cooking appliance 100 in an installed state in a cooking appliance 100.

As in FIG. 4, the cooking appliance 100 here comprises a cooking chamber 101 with a bottom wall 104. In the exemplary embodiment shown here, the bottom wall 104 has a liquid discharge opening 106 and eight guide devices 108 sloping towards the liquid discharge opening 106.

In this case, a straining device 1 with a plurality of passages 3 for draining liquid is arranged above the liquid discharge opening, said passages being designed here as holes 4 and as an embossment 5. Thus, the straining device 1 here makes it possible to separate and retain solids from a solid-liquid mixture.

In the exemplary embodiment shown here too, the straining device 1 can be locked over the liquid discharge opening 106 exclusively in the predetermined orientation 9 shown here.

Also, in the predetermined orientation 9 shown here, the embossments 5 are oriented such that one of the embossments 5 together with a respective one of the guide devices 108 in each case forms a common continuous channel through which a liquid can be guided particularly well and quickly out of the cooking chamber 101 through the liquid discharge opening 106.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements. e.g., A and B. or the entire list of elements A, B and C.

LIST OF REFERENCE SIGNS

1 Straining device
2 Straining body
3 Passage
4 Hole
Embossment
6 Upper side
7 Locking device
8 Orientation device
9 Predetermined orientation
10 Width
11 Height
12 Cross-section
100 Cooking appliance
101 Cooking chamber
102 Opening
103 Door
104 Bottom wall
105 Steam source
106 Liquid discharge opening
107 Liquid discharge device
108 Guide device
109 Positioning device
110 Cross-section
111 Control device
112 Display device
113 Operating device
114 Side wall
115 Back wall
116 Width
117 Depth
118 Housing device
200 Steam cooking device

The invention claimed is:

1. A cooking appliance, comprising:

at least one cooking chamber having at least one opening configured to fill the at least one cooking chamber and at least one door configured to close an opening of the at least one cooking chamber, wherein the at least one cooking chamber is delimited at least by a bottom wall and is heatable by at least one steam source, wherein the bottom wall has at least one liquid discharge opening by which at least one liquid is dischargeable from the at least one cooking chamber into a liquid discharge device, and wherein a straining device is arranged at least sectionally above the liquid discharge opening, the straining device comprising:

at least one straining body having at least two passages configured to drain liquid; and at least one locking device by which at least the at least one straining body is lockable in the cooking appliance at at least one section of the cooking appliance in an installed state, wherein at least one passage comprises a hole, and wherein at least one passage comprises an embossment, wherein the bottom wall comprises at least one guide device by which at least one liquid and/or at least one solid-liquid mixture is guidable in a direction of the liquid discharge opening,

13 wherein the straining device comprises at least one orientation device configured to position the at least one straining body installed in the cooking appliance in at least one predetermined orientation at at least one section of the cooking appliance, and wherein, in the at least one predetermined orientation, at least cross-sections of the at least one embossment and a cross-section of the at least one guide device are arranged substantially congruently to one another so that at least one liquid is guidable out of the cooking chamber via the at least one guide device and through the at least one embossment to the liquid discharge opening.

2. The cooking appliance of claim 1, wherein the at least one straining body comprises a plurality of embossments along a circumference of the at least one straining body.

3. The cooking appliance of claim 1, wherein the at least one straining body is substantially circular.

4. The cooking appliance of claim 1, wherein the at least one straining body has an upper side which is at least sectionally convex.

5. The cooking appliance of claim 1, further comprising:
at least one orientation device configured to position the at least one straining body installed in the cooking appliance in at least one predetermined orientation at at least one section of the cooking appliance.

6. The cooking appliance of claim 1, wherein the at least one guide device slopes towards the liquid discharge opening at least sectionally.

7. The cooking appliance of claim 1, wherein the bottom wall slopes down at least sectionally towards the liquid discharge opening and/or the at least one guide device.

8. The cooking appliance of claim 1, wherein the bottom wall comprises a plurality of guide devices.

9. The cooking appliance of claim 8, wherein the plurality of guide devices comprises eight guide devices.

10. The cooking appliance of claim 1, wherein the straining device is lockable on the liquid discharge device by the at least one locking device.

11. The cooking appliance of claim 1, wherein the bottom wall and/or the liquid discharge device comprises at least one positioning device configured to reproducibly position the straining device in and/or above the liquid discharge opening.

12. The cooking appliance of claim 1, wherein the straining device is lockable exclusively in one predetermined orientation by the at least one locking device above the liquid discharge opening.

13. A method comprising:
providing the cooking appliance of claim 1; and
draining a liquid through the straining device of the cooking appliance.

14. The cooking appliance of claim 1, wherein the cooking appliance comprises a steam cooking appliance.

* * * * *